United States Patent [19]

Zhou et al.

[11] Patent Number: 4,914,854
[45] Date of Patent: Apr. 10, 1990

[54] INSECT TRAP

[76] Inventors: Peng-Wei Zhou, 3704 Emily St.;
Henry Wong, 3704 Emily St., both of
Kensington, Md. 20895

[21] Appl. No.: 217,858

[22] Filed: Jul. 12, 1988

[51] Int. Cl.⁴ .............................................. A01M 1/10
[52] U.S. Cl. ...................................................... 43/112
[58] Field of Search ................ 43/112, 117, 118, 119,
43/121, 133, 122, 107, 108

[56] References Cited

U.S. PATENT DOCUMENTS

| | | | |
|---|---|---|---|
| 1,882,380 | 10/1932 | Braum | 43/107 |
| 1,996,293 | 4/1935 | House | 43/113 |
| 3,935,662 | 2/1976 | Hamid et al. | 43/112 |
| 4,037,351 | 7/1977 | Springer | 43/112 |
| 4,217,723 | 8/1980 | Hrebec | 43/122 |
| 4,423,564 | 1/1984 | Davies et al. | 43/121 |
| 4,523,404 | 6/1985 | De Yoreo | 43/112 |
| 4,563,836 | 1/1986 | Woodruff et al. | |

Primary Examiner—Nicholas P. Godici
Assistant Examiner—Michael W. Starkweather
Attorney, Agent, or Firm—Jones, Tullar & Cooper, P.C.

[57] ABSTRACT

A device for catching roaches and other insects utilizing an electric shock to catch or kill such insects is disclosed. An electrical integrated circuit utilizing automatic on and off switching is used to enable roaches and insects to enter the device and then periodically shock them and kill them. The design provides safety, efficiency and lower cost without environmental pollution thereby permitting use around small children and pets. The device includes a cover which admits roaches and insects into the device and which includes openings that are sufficiently small to prevent entry of a child's hand or a pet's paws. When the cover is removed, a microswitch automatically cuts the electrical circuit off. The device includes a housing in which is located a conical downwardly and inwardly sloping surface on which is carried a helical pair of conductors connected to the electrical circuit. When a voltage pulse is applied to across the conductors, any roaches or other insects which are in contact with the conductors are shocked and fall downwardly toward the bottom of the cone, which opens into a container partially filled with water to drown the insects.

2 Claims, 4 Drawing Sheets

INSECT TRAP

BACKGROUND OF THE INVENTION

The present invention is directed to a device for catching insects, and more particularly, catching insects such as cockroaches.

In the past, many methods have been used in attempts to control small household pests such as bugs, cockroaches, and the like. There are two basic methods of control, physical and chemical. The chemical method generally uses poison to kill the insects and roaches, but it is not safe in households, can pollute the environment and further is unsightly. With poison containers, it is easy to shake out loose poison, or to probe through openings to reach the poison, so that these materials are dangerous for pets or small children. In restaurants, it is impossible to use poison methods to kill cockroaches because of the safety factor. In some devices which use physical devices, the insects are trapped in the device after entering, either by mechanical construction or by providing a gummy substance to which the insects stick. Some of these devices, however, ignored the characteristics of the insects which are to be killed, some used methods which are not very reliable, and others were too complex to use in practice. Others worked, but were soon filled and became useless.

The present invention uses an electrical shock process to catch or kill insects or roaches and thereby overcomes the shortcomings of prior devices, and performs at a high efficiency with safety, convenience, and long life at a low price.

SUMMARY OF THE INVENTION

It is, therefore, an object of the present invention to provide a high efficiency method for catching or killing insects such as bugs, cockroaches and the like.

Another object of the present invention is to provide a clean method of killing insects which will not pollute the environment.

A still further object of the invention is to provide a physical method of capturing and killing undesirable insects which does not use poison so that it is safe for small children and pets.

Another object of the present invention is to provide a small, compact trap which is economically manufactured while being effective to destroy insects, bugs, cockroaches, and the like in a safe and efficient manner. The size of the trap can be changed according to the size of the insects to be captured. The device uses an electrical circuit which is very simple and does not require adjustment, with the exception of a resistor which can be changed in accordance with the different insects which are to be trapped and killed. Furthermore, the device of the present invention is suitable for use in open fields where it can be used to catch or kill agricultural insects with a change in only the cover of the device.

Generally speaking, the present invention relates to an electrical shock station for insects such as bugs, roaches or the like, which comprises a housing having an opening at the top, a protective cover for the opening, and apertures in the cover for admitting insects into the device. The housing has an outer sloped surface which enables the insects to crawl into the device, with an automatic electrical circuit within the device connected to a sloping interior wall on which a series of electrodes are positioned so that when the insects contact the electrical conductors, they will receive a periodic electrical shock. The device is provided with automatic safety switch to provide safety for pets and children. The present device takes advantage of the characteristic of insects such as roaches that when they are stunned or in a coma because of an electrical shock, they lose the ability to retain their hold on the sloping interior surface of the device and fall downwardly into a water container. The shock also removes their ability to swim so that the insects then drown.

The present invention is very convenient to use. All that is required is that bait be placed in the device and that a container such as a bottle or vase of water be placed under the interior sloping wall. This water container can be conveniently changed when the device becomes full. Because of the long life of the electrical elements, the present device is long lasting. Furthermore, it can be used in offices, houses, restaurants, or in open fields. The device is particularly suitable for places where insecticides or other chemical poisons cannot be used, and in practical experiments it has been shown that the device is capable of killing hundreds of roaches of any size.

BRIEF DESCRIPTION OF THE DRAWINGS

The foregoing, and additional objects, features and advantages of the present invention will become apparent to those of skill in the art from a consideration of the following detailed description of a preferred embodiment thereof, taken in conjunction with the accompanying drawings, in which.

DESCRIPTION OF PREFERRED EMBODIMENT

Figure 1:
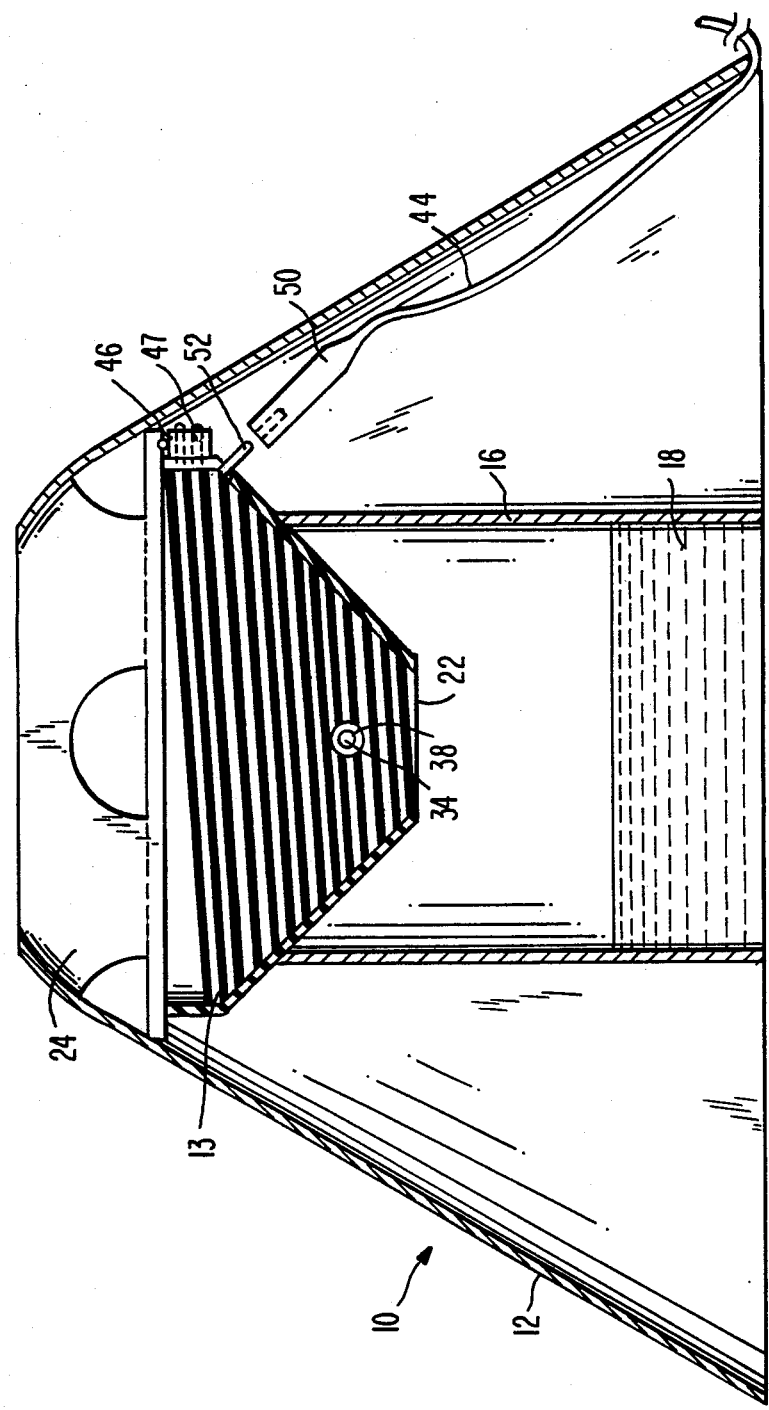
FIG. 1 is a cross-sectional view of a preferred form of the present invention.
Figure 2:
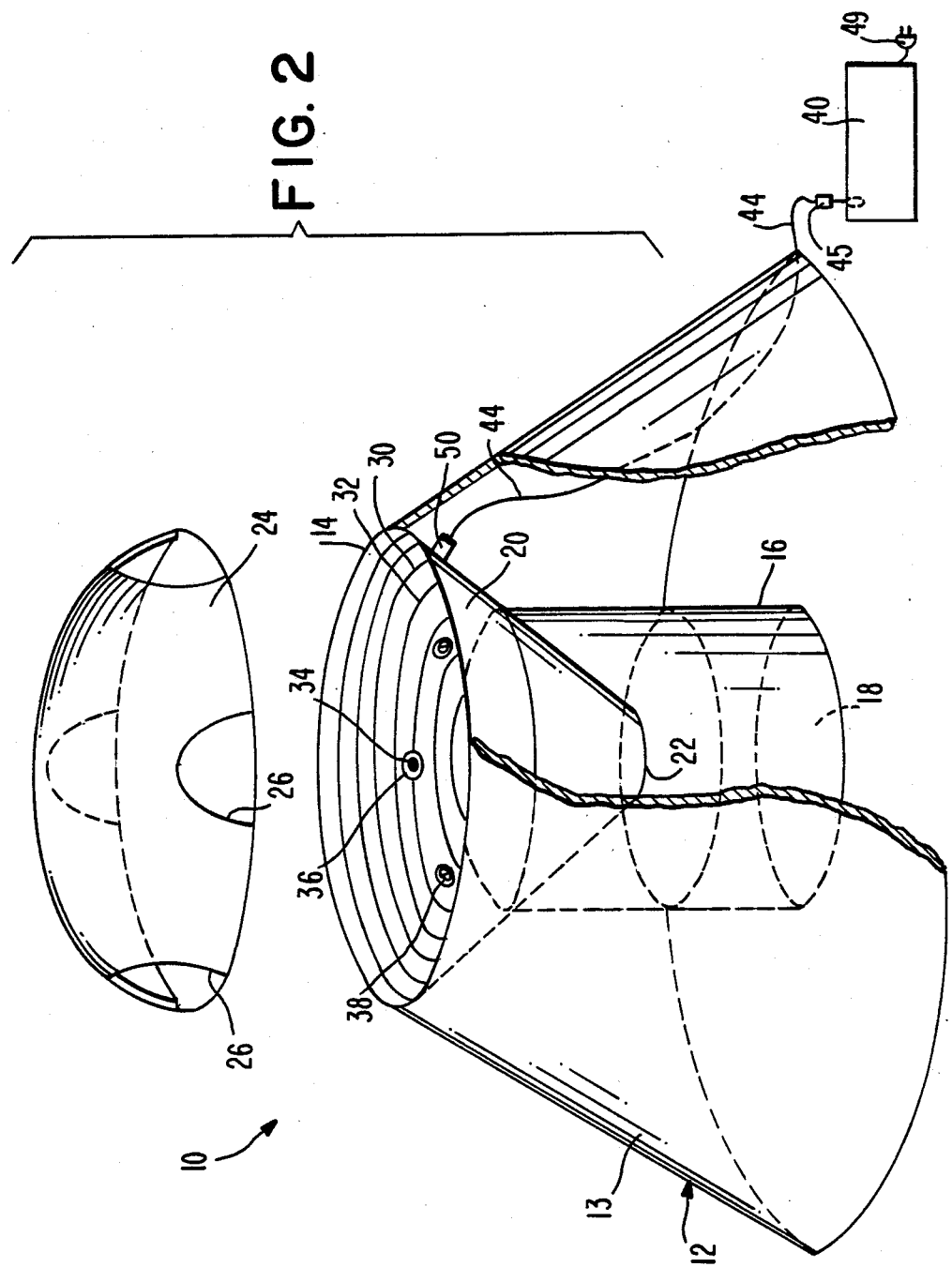
FIG. 2 is a top perspective view of the device of FIG. 1, partially cut away and partially exploded.
Figure 3:
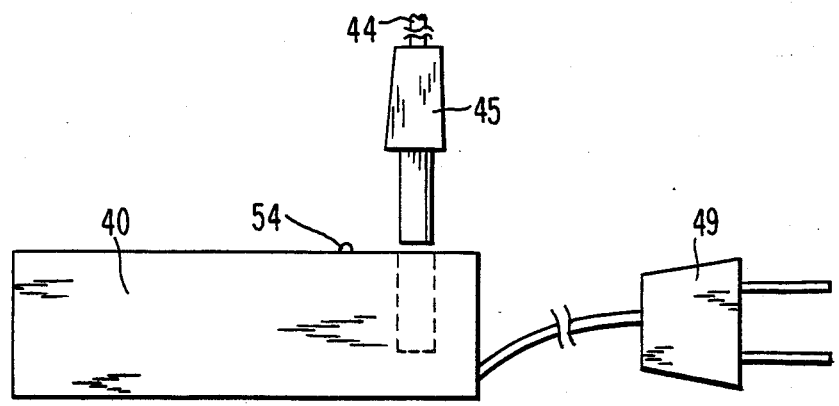
FIGS. 3 and 4 are side and top views, respectively, of the automatic control circuit housing for the present invention.
Figure 4:
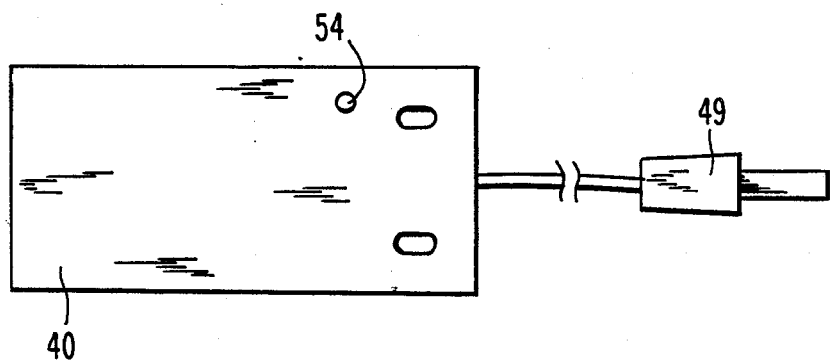

Referring now to the drawings, there is illustrated generally at 10 an insect trap in accordance with the present invention, the trap including a continuous, generally conical housing 12 having an upwardly inclined, generally conical outer surface 13 and a circular open top 14 (see FIG. 2). A container 16 is located within the housing for receiving a supply of water 18.

Located within the housing is a downwardly inclined inner conical wall 20 having a top vertical rim portion connected at an upper edge to the housing 12 at the open top 14 of the housing. The conical wall extends longitudinally downwardly and inwardly into the interior of the container 16. The conical wall 20 has an open bottom 22 which opens into the interior of container 16.

A removable cover 24 closes the open top 14 of the housing. This cover includes at least one entry hole, or aperture 26, and preferably a series of such entry holes around its periphery to permit insects which crawl up the exterior wall 12 to enter the trap 10. Insects which enter the housing through apertures 26 reach the inner conical wall 20.

A pair of electrically conductive, thin foil conductors 30 and 32 (see FIG. 7) are mounted on the surface of the inclined wall 20 with the conductors parallel to each other and closely spaced, as illustrated. The conductors extend around the conical wall in a continuous spiral from near the top thereof to near the bottom thereof, 32. However, if such a short circuit should occur, an alarm light 54 is turned on in the control circuit of FIG. 6.

Figure 5:
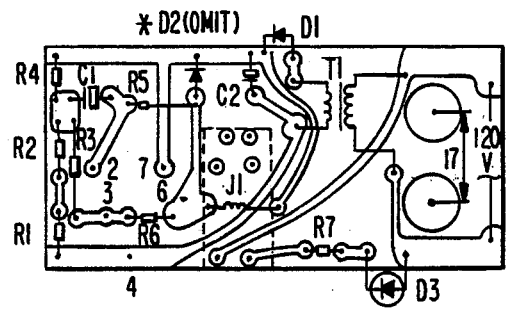
FIG. 5 is a back view of a printed circuit board used with the automatic control circuit of the present invention.
Figure 6:
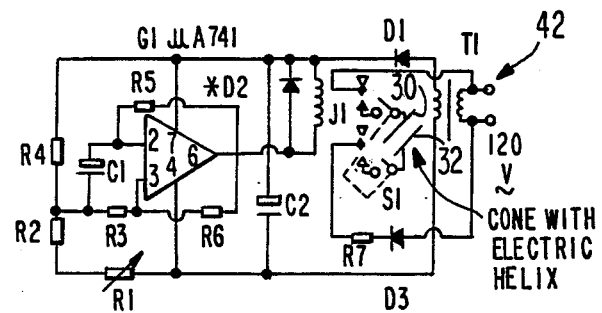
FIG. 6 is a schematic diagram of an automatic control circuit usable in the device of the present invention.

FIG. 6 illustrates in detail the automatic control circuit, with FIG. 5 illustrating the positioning of the elements on a printed circuit board in accordance with a preferred form of the invention. The circuit elements in FIGS. 5 and 6 have the following parameters:

TABLE I

| NAME | RANGE | NAME | RANGE | NAME | RANGE |
|------|-------|------|-------|------|-------|
| R1 | 1K | R6 | 33K 1/16W | *D2 | 20MA 12V |
| R2 | 500Ω 1/16W | R7 | 5.1K 1W | D3 | Light Diode |
| R3 | 10K 1/16W | C1 | 470μ/12V | T1 | 120/12V 1.5W |
| R4 | 2K 1/16W | C2 | 470μ/12V | J1 | 12V/15MA |
| R5 | 91K 1/16W | D1 | 20MA/30V | S1 | Micro switch | with the parallel conductors covering substantially the entire surface of the wall from its top rim at opening 14 to the bottom opening 22 so that an insect on the surface of the wall 20 will, in all likelihood, be in contact with both conductors. Food bait 34 is secured on the inner conical wall, preferably positioned on an isolator, or insulating pad 36 secured to the wall by a suitable fastener 38.

An electrical control box 40 containing an electrical switching circuit 42 (FIG. 6) is connected by way of line 44 from plug 45 across the conductors 30 and 32. Circuit 42 is a switching circuit which operates to periodically supply electrical AC potential across the pair of conductors 30, 32 mounted on the wall 20 to provide a voltage which is sufficient to electrically shock insects which are in contact with adjacent conductors. This electric potential is sufficiently high to injure the insects and the wall 20 is inclined at a slope which is sufficiently steep to cause the injured insects to slide down the wall and to fall into the container 16. A microswitch 46 is connected in the circuit between the line 44 and the conductors 30, 32 and is responsive to removal of the removable cover 24 to disable the supply of electric potential from a source of AC connected to circuit 42 by way of plug 49 to the conductors 30, 32. The line 44 is connected to the microswitch by way of plug 50, 52.

The cover 24 can have a variety of shapes, and the shape and size of the insect holes 26 can be changed to permit only insects to crawl into the housing while preventing access to the electrical conductors by the hands or fingers of small children or by the paws of pets. The microswitch 46 reduces the risk of shock by disabling the electrical circuit when the cover 24 is opened.

In operation, insects will climb up the inclined surface 13 of the housing 12 and enter into the cone 20 through the holes 26 in the cover 24. The insects will crawl down the inclined surface 20 to eat the bait 5. The automatic electrical control circuit periodically produces a voltage which, when switched on, produces an electrical pulse through the lines 30, 32 to shock the insects, making them jump or stunning them to produce a coma, so that they fall into the container 16, which is full of water. The insects either lose their swimming ability or are unconscious because of the electrical shock, and they soon drown.

Figure 7:
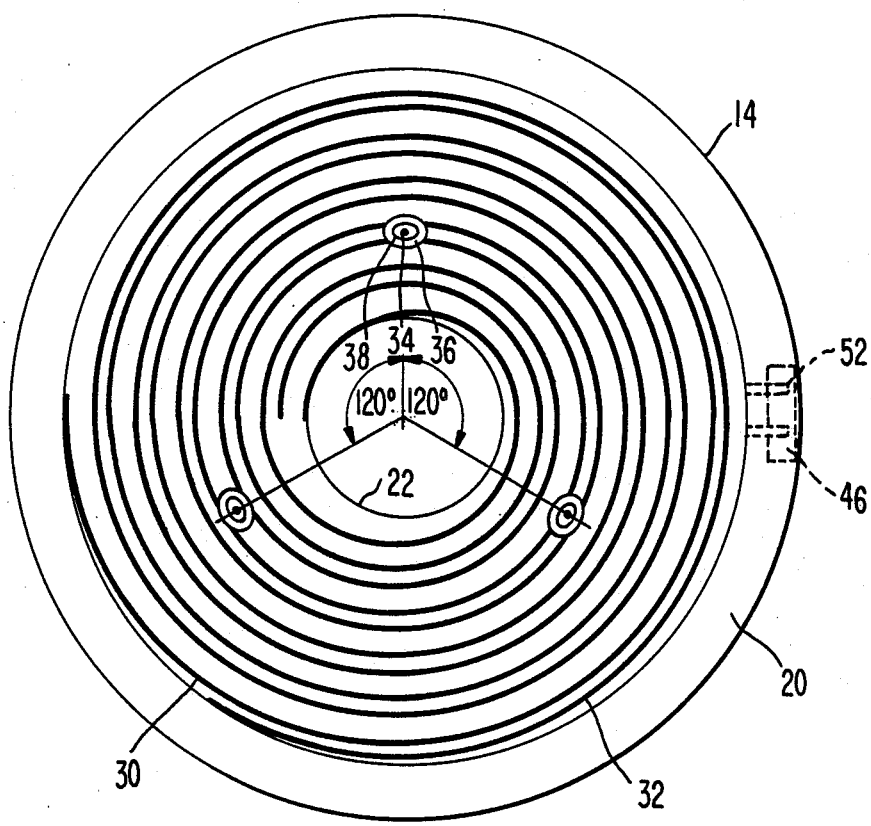
FIG. 7 is a top plan view of the interior sloping wall portion of the device of FIG. 1.

The top view of FIG. 7 clearly illustrates the arrangement of the conductors on the cone-shaped surface 20, and shows the relationship between the bait 34, the insulator 36 and the fastener 38 which secures the bait in place. The insulator 36 prevents the fastener from producing a short circuit between the parallel lines 30 and The electric circuit utilizes an integrated circuit which operates to periodically activate relay J1 to close its switches, and then to release it. Closure of this relay supplies a voltage, for example, 120 volts, across the conductors 30, 32 for a short period of time and then the switch releases relay J1. The electrical pulse is supplied through the line 44 and through connectors 50 and 52 for connection to the conductors 30, 32, as previously described. The electrical circuit preferably is an oscillator having a duty cycle of about 1 in 20 or 1 in 30, and accordingly, is very efficient. Because some insects are very sensitive to electricity, a relay J1 is used to prevent the leakage of electricity into the conductors during the off portion of the cycle.

The inside of the cone is inclined at any angle and is not limited to that illustrated. When the insects are shocked, they fall down the incline because of gravity, and fall into the container. It will be understood that although the conductors are shown in a spiral, parallel arrangement, it should be understood that other shapes such as rings of conductors may be used. The number and size of the insect openings 26 are not limited to the illustrated embodiment, and it should further be understood that when the device is used outside the house the cover design can be changed into an umbrella-like or other shape to protect the device. It will be further understood that the circuit includes a protective resistor R7 (FIG. 5) which acts as a fuse in the event the conductors are short circuited.

Thus, there has been described a novel and unique insect trap. Although the invention has been described in terms of a preferred embodiment, it will be understood that variations and modifications may be made within the scope of the following claims.

We claim:

1. An insect trap, comprising:
   a continuous conical housing having an upwardly inclined, generally conical outer surface and a circular, open top;
   container means within said housing for receiving a supply of water;
   a downwardly inclined inner conical wall having a top vertical rim portion connected at an upper edge to said housing at said open top and extending longitudinally downwardly and inwardly into said container;
   removable cover means for closing said open top of said housing, said cover including at least one entry hole to permit insects to enter said housing to reach said wall;

a pair of electrically conductive thin foil conductor mounted on said inclined wall, said conductors being parallel to each other and closely spaced to each other, said conductors extending around said conical wall in a continuous spiral from near the top thereof to near the bottom thereof with said parallel conductors covering substantially the entire surface of said wall;

means securing food bait on said inner conical wall within said housing to attract insects onto said wall and into contact with one or more of said conductors; and electrical switching means connected to said conductor means for periodically supplying electrical a.c. potential across said pair of conductors on said wall to electrically shock insects in contact with said adjacent conductors, said electrical potential being sufficiently high to injure insects, and said wall being inclined at a slope sufficiently steep to cause injured insects to slide down said wall and to fall into said container; and microswitch means responsive to removal of said removable cover means from said housing for disabling said supply of electrical potential to said conductors.

2. The insect trap of claim 1, wherein said cover includes a plurality of insect access holes.

* * * * *

UNITED STATES PATENT AND TRADEMARK OFFICE
CERTIFICATE OF CORRECTION

PATENT NO. : 4,914,854
DATED : April 10, 1990
INVENTOR(S) : Zhou et al

It is certified that error appears in the above-identified patent and that said Letters Patent is hereby corrected as shown below:

ON TITLE PAGE:

-- Inventors: Peng-Wei Zhou, 3704 Emily St.; Henry Wong, 3704 Emily St., both of Kensington, MD 20895, and Siu Hung Cheng, 6520 Summerton Way, Springfield, VA 22150 --.

Signed and Sealed this

Eighth Day of October, 1991

Attest:

HARRY F. MANBECK, JR.

*Attesting Officer*  *Commissioner of Patents and Trademarks*